Aug. 2, 1938.  J. HOLTZMAN  2,125,502
SAFETY RAZOR BLADE
Original Filed Feb. 21, 1931
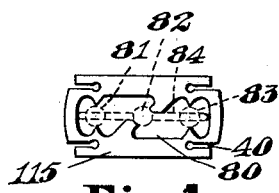
Fig. 1.
Fig. 2.
Fig. 3.
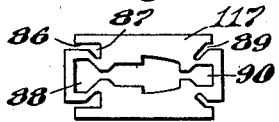
Fig. 4.
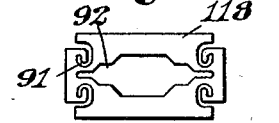
Fig. 5.
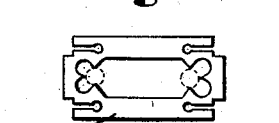
Fig. 6.
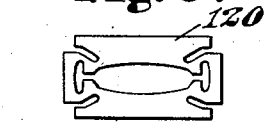
Fig. 7.
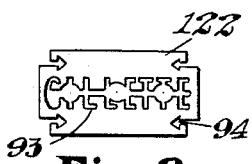
Fig. 8.
Fig. 9.
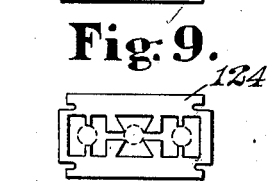
Fig. 10.
Fig. 11.
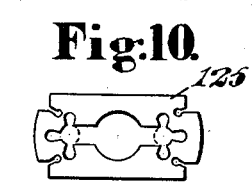
Fig. 12.
Fig. 13.
Fig. 14.
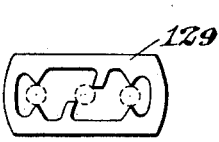
Fig. 15.
Fig. 16.
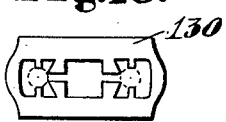
Fig. 17.
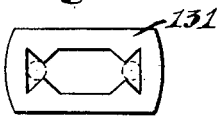
Fig. 18.
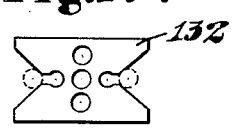
Fig. 19.
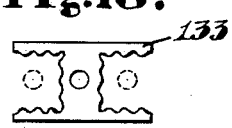
Fig. 20.
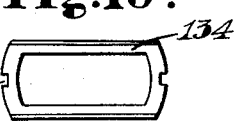
Fig. 21.
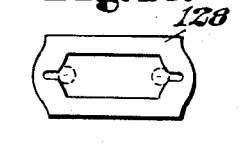
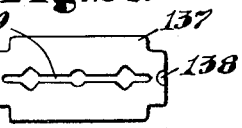
INVENTOR
John Holtzman,
by H. W. Kenway. Atty.

Patented Aug. 2, 1938

2,125,502

UNITED STATES PATENT OFFICE 2,125,502

SAFETY RAZOR BLADE

John Holtzman, New York, N. Y., assignor to Gillette Safety Razor Company, Boston, Mass., a corporation of Delaware Original application February 21, 1931, Serial No. 517,497. Divided and this application February 10, 1933, Serial No. 656,176

1 Claim. (Cl. 30—351)

This invention relates to safety razors and to the blades to be used in such razors. My invention contemplates, among other things, the provision of simple and efficient means for properly and accurately positioning a blade in the holder therefor, as when the holder is assembled ready for shaving, which means allows the easy removal of the blade from the holder, when desired.

My invention further contemplates the provision of blades which are designed to fit not only my improved razor, but which are also adapted to fit various razors of the well-known Gillette type wherein either a plurality of positioning pins are used, or wherein a blade-positioning bar is used. The blades of my invention also possess features of mechanical merit whereby they are adapted to conform readily and accurately to the curved faces of the blade-clamping members of the razor whatever may be the shape of the latter.

My invention further contemplates the provision of flexible blades provided with slots or recesses or both, or depressions of such size, shape and arrangement that a substantial part of the interior of the blade is removed to make it as light and as flexible as possible, while imparting such a shape to the blade as to make counterfeiting thereof practically impossible, particularly in connection with my improved holder. In other words, the serious problem of preventing imitators from making blades to fit holders, marketed by reputable manufacturers, may be solved by employing my invention, since imitators are compelled thereby to copy precisely the outline and slots of the blade intended for a particular holder. Any variation of said outline and slots would result in an inoperative structure or one too weak to function or would result in breaking the blade apart.

An important feature of my invention consists in a thin, flexible safety razor blade intended to be flexed and used in a position of transverse curvature and having flexing hinges at its ends defined by an internal slot substantially as long as the cutting edges of the blade and spaced external slots extending inwardly from the ends of the blade to points adjacent to or within the ends of the internal slot. I have found that the bending stresses of a blade are distributed in flexing hinges of this character in an advantageous manner and that objectionable stress concentrations are thereby avoided.

These and other features of my invention will be best understood and appreciated from the following description of preferred embodiments thereof, selected for purposes of illustration and shown in the accompanying drawing, in which Figs. 1 to 12 inclusive are plan views of a variety of slotted and recessed double-edged wafer blades, designed to be used in my improved razor or in positioning pin or bar razors of the Gillette type.

Figs. 13 to 17 inclusive are similar views of similar slotted blades in which the reentrant recesses have been omitted.

Figs. 18 and 19 are similar views of recessed blades adapted for use in my improved razor or in the positioning pin type of Gillette razors.

Fig. 20 is a similar view of a blade in which the maximum amount of material has been removed to provide a frame of minimum width and maximum flexibility, and Fig. 21 is a plan view of a blade having recesses, slots and depressions therein, adapted to fit into and to be positioned by my improved razor.

The blades herein shown are adapted for use in connection with razors of the Gillette type, wherein a cap or clamping member co-operates with a guard member and is adjusted by rotating a handle, to flex and clamp a blade between the members. The handle is internally threaded at its upper end to engage a suitable externally-threaded pin or stud depending from the cap. The blade is clamped between the co-operating curved faces of the cap and guard and maintained in a position of pronounced transverse curvature. If desired the blade-shaping faces of the cap and guard may be also warped, twisted or helically distorted to impart a drawing cut to the edge of the blade in shaving.

To aid in making the blade sufficiently flexible so that it may be twisted, said blade is suitably slotted by the removal of a considerable part of the inner material therefrom. The edges of the blade may be further made more readily distortable by means of reentrant recesses arranged adjacent each of the blade corners. However, the exact shape of the recesses and slots is of secondary importance only, provided that sufficient material is removed to allow the free flexing of the blade. In some cases the blade may be skeletonized by removing portions of the blade both internally and externally. The stresses and strains of the blades are very largely reduced by the skeletonization of the blades and in this process deep recesses may be made in the external edge contour of the blade as well as the removal of the central longitudinal zone of the blade. The skeletonization of the blades also reduces warping of the blade material so that the blades may be readily stacked in compact flat superposed relation. The thin, slender, skeleton-like portions comprising flexing hinges connect the blade sections or cutting portions and maintain said sections or portions in spaced relation. The remote opposed edges of the sections which constitute the longitudinal edges of the blade are sharpened to produce shaving edges.

In Figs. 1 to 21 inclusive I have shown blades 115 to 137 inclusive, having a variety of slots, recesses or depressions, all designed to facilitate flexing of the blades.

As illustrated in Fig. 1, the external recesses 40, each comprises a substantially straight portion terminating in a circular portion, the straight portion being parallel to the edge of the blade, while the circular portion tends to prevent stress concentration at the end of the slot. While the internal aperture 80 and said recesses 40 may be of various shapes, as illustrated by the various blades shown, I prefer that the ends of the aperture be substantially parallel to the ends of the blade, that the sides of the aperture be substantially parallel to the edges of the blade, and that the recesses 40 be substantially parallel to both the adjacent portion of the slot and to the blade edge, for the reasons which will be more fully pointed out hereinafter.

However, regardless of what the shape of the aperture 80 or the recesses 40 or blade end may be, inter-engaging positioning means for the blade are formed on the guard member and on the clamping member. Said means takes the form of a projection upstanding above the blade-engaging portions of the upper surface of the guard or cap and having an outline designed to conform to and to fit into the aperture of the blade.

It will be further understood that the various cooperating projections and recesses on the guard member and on the clamping member accurately position the blade for shaving purposes with the edge of the blade at the proper distance from and parallel to the axis of the guard portion of the guard member.

In Fig. 1, I have shown a flexible and distortable blade 115 in which a maximum amount of material has been removed for the purposes above described and provided with recesses 40 and the slot 80. The end of the slot 80 is parallel to the end of the blade. The blade sections are maintained in spaced relation by slender, substantially U-shaped flexing hinges having their legs connected at their ends to the blade sections. The sections are provided with ears to engage positioning pins 81 and 83, to produce alignment of the blade. Other ears are provided on the blade sections to engage the central pin 82 to prevent longitudinal displacement of the blade. If the pins are circular, the ears engage the pins at diametrically opposed points. This blade is adapted to the Gillette razor of the three-pin type as well as the Gillette razor of the bar type.

Fig. 2 shows a blade 116 similar to the blade 115 but it is not so highly skeletonized and does not require ears on the blade sections to prevent longitudinal displacement when used with the Gillette razor of the three-pin type since the ears which are adapted to engage the end pins prevent longitudinal displacement. This blade is also especially adapted to the Gillette razor of the bar type. The ears are adapted to engage the bar and the bights of the U-shaped flexing hinges are adapted to engage the ends of the bar and prevent longitudinal displacement.

In the blade 117 the skeletonization is partly non-symmetrical and otherwise differs from the blade 116 in that the ears are adapted to engage the adjacent sides of the end pins instead of the remote sides, as indicated in blade 116.

The blade 118, shown in Fig. 4, differs from blade 116 in that the modified skeletonization produces slender short legs for the U-shaped flexible connecting hinges.

In Fig. 5, the skeletonized blade 119 is especially adapted to the Gillette razor of the three-pin type. The bights of the U-shaped flexing hinges are provided with ears to prevent endwise displacement.

Skeletonized blade 120 of Fig. 6 differs only in a modified skeletonization contour from that disclosed in blade 116.

In Fig. 7 the blade 121 is skeletonized by enlarging the blade slot transversely and providing apertures adjacent the recessed corner of the blade.

In Fig. 8, the slot 93 is made in the form of a designation as, for example, the name of the manufacturer. While the recesses 94 are similarly made in the form of a designation as, for example, the trade-mark of the manufacturer, the blade nevertheless embodies generally the principles of my invention above described.

In Fig. 9 I have shown a skeletonized blade of the general type which I have designated as a frame blade but provided with ears 95 which enable the blade to be used in either the bar type or the pin type of conventional Gillette razors. The ears when engaging pins produce alignment and prevent longitudinal displacement of the blade, but when engaging a bar produce alignment only while the flexing hinges engage the ends of the bar and prevent longitudinal displacement of the blade.

In Fig. 10, the blade 124 is a skeletonized frame blade having a large rectangular slot defining the inner edge of the frame structure. The inner edge of the frame structure is interrupted by ears extending toward the longitudinal center of the blades, said ears comprising positioning means including both aligning means and means to prevent longitudinal displacement of the blade.

The blade 125, shown in Fig. 11, like the blades 115, 116 and 119, is provided with exterior slots which co-operate with the ends of the internal aperture in defining flexing hinges at the end of the blade. In this case, the outer line of flexing hinges is curved and the exterior slots are disposed somewhat obliquely. It will be noted that they extend inwardly beyond the ends of the internal aperture.

The blade 126, shown in Fig. 12, has exterior slots which extend almost to the center of the blade and in this case the flexing hinges are U-shaped with longitudinally-extending legs and undulatory contour.

The blades 127 and 128, shown in Figs. 13 and 14, are provided with large internal apertures which impart a skeletonized structure to the blades. At each end, the internal apertures are provided with narrow outwardly extending recesses which reduce the effective area of the flexing hinges and co-operate with positioning means in locating the blade in the razor.

The blade 129, shown in Fig. 15, is provided with a large internal aperture having oblique tongues extending inwardly to engage the centrally disposed stud in the razor. The aperture is provided at each end with a restricted portion and with terminal enlargements marked off from the body of the aperture by oppositely-disposed tongues adapted to engage the studs in the razor.

The blade 130, shown in Fig. 16, is provided with an internal aperture having a central rectangular enlargement and terminal enlargements of the same width conforming in their transverse contour to the ends of the blade and having oppositely disposed tongues adapted to engage locating studs in the razor.

The blade 131, shown in Fig. 17, is provided with a large internal aperture having transverse terminal enlargements which are substantially triangular in contour and adapted to receive locating studs in the razor.

The blade 132, shown in Fig. 18, is provided with three transversely-disposed perforations and with external recesses having walls which converge inwardly to an inwardly extending slot.

The blade 133, shown in Fig. 19, has a single, centrally disposed flexing hinge defined by large external recesses of undulatory margin.

The blade 134, shown in Fig. 20, has a large internal aperture of substantially the same shape as the blade contour. The ends of the blade are provided with square notches 96 by which the blade may be located in the razor.

The blade 137, shown in Fig. 21, is provided with softened upstanding lugs or ears 138—140 at its respective ends and with an elongated internal slot 139. The ears 138—140 are adapted for use as locating means in co-operation with correspondingly-shaped recesses in the razor.

The present application is a division of my copending application, Ser. No. 517,497, filed February 21, 1931, now United States Letters Patent No. 1,987,191, dated January 8, 1935.

Having thus described my invention, what I claim as new and desire to secure by Letters Patent of the United States is:—

A safety razor blade having a central longitudinal slot, parallel cutting edges on the blade portions spaced by said slot, end portions of a width less than that of the main body of the blade, and pliable neck portions forming narrow bands directed at right angles to said cutting edges within the limits defined by the length of said slot and connecting said end portions and said spaced blade portions, the flexibility of said pliable portions exceeding that of said end portions.

JOHN HOLTZMAN.